United States Patent
Jebai et al.

(10) Patent No.: US 11,906,349 B2
(45) Date of Patent: Feb. 20, 2024

(54) METHODS, SYSTEMS AND DEVICES FOR DETERMINING A RESONANCE FREQUENCY OF A MECHANICAL SYSTEM

(71) Applicant: Schneider Toshiba Inverter Europe SAS, Pacy sur Eure (FR)

(72) Inventors: Al Kassem Jebai, Vernon (FR); Mohamad Koteich, Vernon (FR)

(73) Assignee: Schneider Toshiba Inverter Europe SAS, Pacy sur Eure (FR)

( * ) Notice: Subject to any disclaimer, the term of this patent is extended or adjusted under 35 U.S.C. 154(b) by 570 days.

(21) Appl. No.: 17/123,285

(22) Filed: Dec. 16, 2020

(65) Prior Publication Data

US 2021/0190582 A1  Jun. 24, 2021

(30) Foreign Application Priority Data

Dec. 20, 2019 (EP) .................................... 19306724

(51) Int. Cl.
*G01H 13/00* (2006.01)
*B06B 1/02* (2006.01)

(52) U.S. Cl.
CPC ........... *G01H 13/00* (2013.01); *B06B 1/0215* (2013.01)

(58) Field of Classification Search
CPC ........ G01H 13/00; B06B 1/0215; H02P 29/50
See application file for complete search history.

(56) References Cited

U.S. PATENT DOCUMENTS

| 7,408,310 | B2 * | 8/2008 | Hong ................. | F04B 35/045 |
| | | | | 417/44.1 |
| 7,902,780 | B2 * | 3/2011 | Okita .................. | G05B 19/404 |
| | | | | 318/632 |
| 9,429,936 | B2 * | 8/2016 | Iijima ................. | G05B 19/404 |
| 2011/0144929 | A1 | 6/2011 | Guey et al. | |
| 2011/0219864 | A1 * | 9/2011 | Yukawa ............. | G01M 17/025 |
| | | | | 73/146 |
| 2012/0235612 | A1 * | 9/2012 | Akashi ............... | H02P 6/10 |
| | | | | 318/400.23 |
| 2017/0294863 | A1 | 10/2017 | Takahashi et al. | |

FOREIGN PATENT DOCUMENTS

EP   1959324 A2   8/2008
EP   2371309 A2   10/2011

OTHER PUBLICATIONS

Extended European Search Report dated May 25, 2020 for European Application No. 19306724.6-1202, 10 pages.

* cited by examiner

*Primary Examiner* — Rina I Duda
(74) *Attorney, Agent, or Firm* — Locke Lord LLP (57) ABSTRACT

A method for determining a resonance frequency of a mechanical system including an electric motor coupled to a mechanical load. The method includes starting the motor by providing a supply voltage using a motor controller, and once the electric motor is running at a predefined target rotational speed, applying a first excitation signal comprising a voltage pulse superimposed to the supply voltage. The method further includes measuring a mechanical response of the mechanical system, using a measurement system coupled to the motor, and analyzing the measured response, to determine at least one resonance frequency of the mechanical system.

8 Claims, 7 Drawing Sheets

METHODS, SYSTEMS AND DEVICES FOR DETERMINING A RESONANCE FREQUENCY OF A MECHANICAL SYSTEM

TECHNICAL FIELD

The present invention relates to methods, systems and devices for determining a resonance frequency of a mechanical system.

BACKGROUND

Aspects of the invention are more specifically applicable to mechanical systems in which an electric motor is connected to a mechanical load.

In some applications, a flexible connection device is used for mechanically connecting the load to the motor. As a result, due to the mechanical properties of the flexible connection device, the mechanical system as a whole may exhibit one or more resonance frequencies. If the system enters resonance during operation, there is a risk that some mechanical parts may be damaged or even destroyed. It is thus desirable to avoid operating the system near or at a resonance frequency, which means that the resonance frequencies have to be determined somehow before operation.

Calculating the theoretical values of the resonance frequencies is not always feasible in practice. However, experimental methods have been developed to determine at least some of the resonance frequencies.

For example, European patent application EP 1,959,324 A2 discloses a method for determining a resonance frequency in a mechanical system comprising an electric motor driving a mechanical load. The method includes varying the supply voltage to drive the motor at different speeds during a test sequence while the load is connected to the motor. The voltage between input terminals of the motor is measured and a post processing operation is used to determine the frequency response and identify one or more resonance frequencies.

A drawback of these known methods is that they require the system to run across a wide range of frequencies, including one or more of the resonance frequencies, thus possibly causing a resonance condition, with all the associated drawbacks, even though the very purpose of these methods is precisely to avoid operating the motor at such resonance frequencies.

SUMMARY

An object of the present invention is therefore to provide improved methods, systems and devices for determining a resonance frequency of a mechanical system.

According to an aspect, a method for determining a resonance frequency of a mechanical system comprising an electric motor coupled to a mechanical load comprises steps consisting of:
  starting the motor by providing a supply voltage using a motor controller;
  once the electric motor is running at a predefined target rotational speed, applying a first excitation signal comprising a voltage pulse superimposed to the supply voltage;
  measuring a mechanical response of the mechanical system, using a measurement system coupled to the motor;
  analyzing the measured response, to determine at least one resonance frequency of the mechanical system.

According to advantageous aspects, the embodiments may comprise one or more of the following technical features, taken alone or according to any possible technical combination:
  Measuring a mechanical response of the mechanical system comprises measuring stator currents of the motor and wherein the resonance frequency of the mechanical system is determined based on the measured stator currents.
  Determining the resonance frequency of the mechanical system comprises: calculating, from the measured stator currents, corresponding stator current values expressed in the synchronous frame of the motor;
  identifying oscillations in the corresponding stator current values;
  determining the resonance frequency based on the identified oscillations.
  The method further comprises calculating phase difference values between the calculated corresponding stator current values and determining the resonance frequency based on the oscillations identified in the phase difference values.
  Measuring a mechanical response of the mechanical system comprises measuring a rotation speed of the motor and wherein the resonance frequency of the mechanical system is determined based on the measured rotation speed.
  The method further comprises applying at least one additional excitation voltage pulse and measuring the corresponding response of the mechanical system, the resonance frequency being determined from the analysis of the measured responses.
  At least one additional excitation pulse differs from the first excitation pulse by at least one feature, such as pulse length or pulse amplitude or the time interval between two consecutive pulses.
  The method further comprises:
  Modifying at least one motor operating parameter to drive the motor at a different rotational speed;
  once the electric motor is running at the new target rotational speed, applying another excitation signal comprising a voltage pulse superimposed to the supply voltage, using the pulse generator;
  measuring the new mechanical response of the mechanical system, using the measurement system;
  analyzing the measured response, to determine at least one resonance frequency of the mechanical system.
  Starting the motor comprises ramping up the supply voltage towards a threshold voltage value, and wherein the motor controller is placed in an open loop control mode once the electric motor is running at the predefined target rotational speed.
  The method includes determining the type of mechanical coupling between the load and the motor based on the measured mechanical response.

According to a further aspect, a method for driving a mechanical system comprising an electric motor coupled to a mechanical load comprises:
  determining the resonance frequency of the mechanical system using a method as described above;
  modifying at least one operating parameter of the motor to avoid generating excitations near or at the determined resonance frequency.

According to another aspect, a device for determining a resonance frequency of a mechanical system comprising an electric motor coupled to a mechanical load, is configured to:

start the motor by providing a supply voltage using a motor controller;

once the electric motor is running at a predefined target rotational speed, applying a first excitation signal comprising a voltage pulse superimposed to the supply voltage;

measure a mechanical response of the mechanical system, using a measurement system coupled to the motor;

analyze the measured response, to determine at least one resonance frequency of the mechanical system.

BRIEF DESCRIPTION OF THE DRAWINGS

Many aspects of the invention will be better understood upon reading the following description of some embodiments, provided solely as examples, and made in reference to the appended drawings, in which.

DETAILED DESCRIPTION OF SOME EMBODIMENTS

Figure 1:
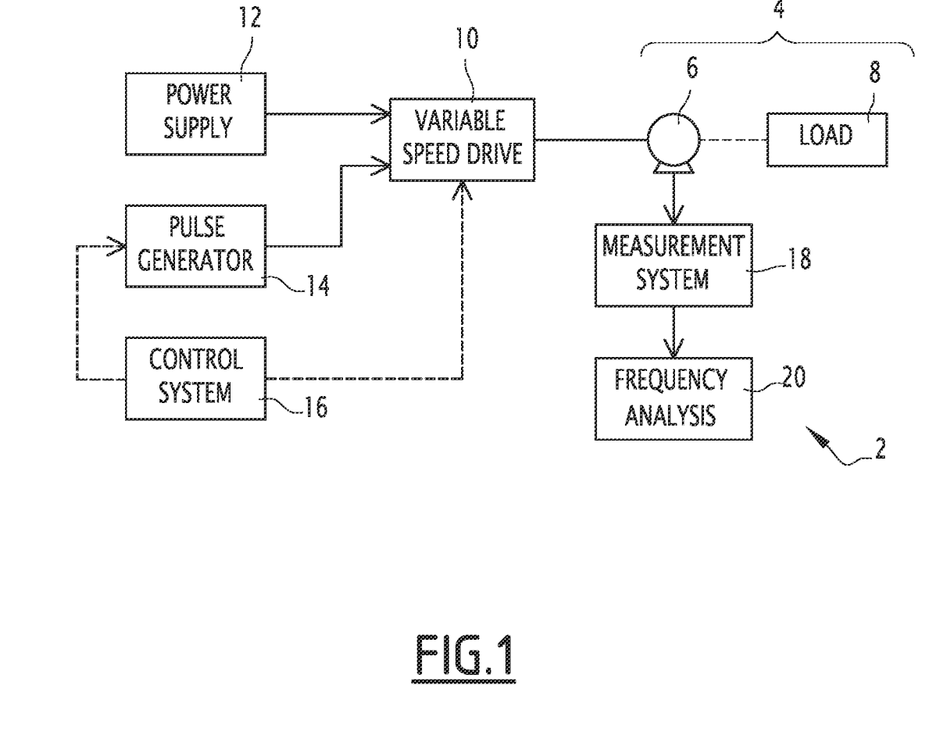
FIG. 1 is a diagram of a mechanical system and a device according to embodiments of the invention for determining at least one resonance frequency of the mechanical system.

FIG. 1 illustrates an exemplary device 2 for determining mechanical properties of a mechanical system 4 comprising an electric motor 6 connected to a mechanical load 8.

For example, the electric motor 6 is an alternating current (AC) electric motor, such as a synchronous motor or an asynchronous motor. In some other embodiments, the machine 6 may be a direct current (DC) motor.

In many embodiments, the motor 6 may be used in industrial facilities, such as industrial production lines, to drive machinery and/or industrial equipment, such as pumps, fans, conveyors, valves, robots, elevators, moveable parts such as gates or shutters, or the like. In other examples, the motor 6 may be used as a prime mover, for example in vehicles such as passenger vehicles or industrial vehicles.

The motor 6 is mechanically connected to the load 8 by a flexible connection device, so as to drive the load 8 when the motor 6 is rotating.

In many embodiments, the motor 6 is driven by supplying a suitable electric voltage to input terminals of the motor 6 using a controller 10, such as a variable speed drive, powered by a power supply 12.

In many embodiments, the device 2 is more generally configured to implement steps of:

starting the motor 6 by providing a supply voltage with the controller 10;

once the motor 6 is running at a predefined target rotational speed, applying a first excitation signal comprising a voltage pulse superimposed to the supply voltage;

measuring a mechanical response of the mechanical system;

analyzing the measured response, to determine at least one resonance frequency of the mechanical system.

For that purpose, the device 2 includes a pulse generator 14 capable of generating a voltage pulse and to inject this voltage pulse to the motor 6, for example by superimposing the generated voltage pulse to the supply voltage fed to the motor 6.

In various embodiments, the pulse generator 14 may be implemented by the controller 10, or may be a device separate from the controller 10. This separate device may be connected to an input terminal of the controller 10 or to the input terminals of the motor 6.

The system 2 further comprises a control system 16 programmed to implement the method steps described above for determining mechanical properties of the system 4, such as determining one or several resonance frequencies of the system 4.

For example, the control system 16 comprises electronic circuitry and may include a generic processor, such as a microcontroller, and a computer memory storing software code and/or executable instructions that cause the processor to implement said method when said code or instructions are executed by the processor.

In alternative embodiments, the control system 16 may comprise a digital signal processor (DSP), or a programmable logic controller (PLC), or a field-programmable gate array (FPGA), or an application-specific integrated circuit (ASIC), or any suitable combination thereof. In addition, analog circuits may be used to implement many of the same functions.

The control system 16 is coupled to the controller 10 and to the pulse generator 14, for example by means of cables or wires or wireless communication links.

The system 2 further comprises a measurement system 18 configured to measure a mechanical response of the mechanical system 4 in response to the excitation signal.

In preferred embodiments, the measurement system 18 comprises one or several current sensors coupled to input terminals of the stator of the motor 6, in order to measure electrical currents for at least some electrical phases of the stator, and preferably for all electrical phases of the stator.

In other words, the measurement system 18 is configured to measure an electrical response of the system 4. This electrical response includes information on the mechanical response of the system 4 (such as rotation speed and/or mechanical vibrations).

This is preferable to and more effective than measuring different mechanical values such as torque or speed or voltages in order to measure the mechanical response of the motor 6.

Preferably, the current sensors are integrated with the motor 6. Thus, current sensors already installed in the motor 6 may be reused and there is no need to add dedicated current sensors. In alternative embodiments, the current sensors may be part of the controller 10, or may be dedicated current sensors.

In other embodiments, the measurement system 18 may be configured to measure the rotation speed of the motor 6.

In other further embodiments, the measurement system 18 may be configured to measure the rotation speed of the motor 6 and said electrical currents.

The device 2 also comprises a signal processing unit 20 configured to analyze the response measured by the measurement system 18 and to automatically determine a resonance frequency based on the measured response.

In the same spirit as what is described in reference to the control system 16, the processing device 20 may be implemented by circuitry of any kind.

In some embodiments, the processing unit 20 is implemented by the control system 16, for example as software code executed by the processor and/or as dedicated circuitry. In other embodiments, the processing unit 20 may be a remote computer server.

Figure 2:
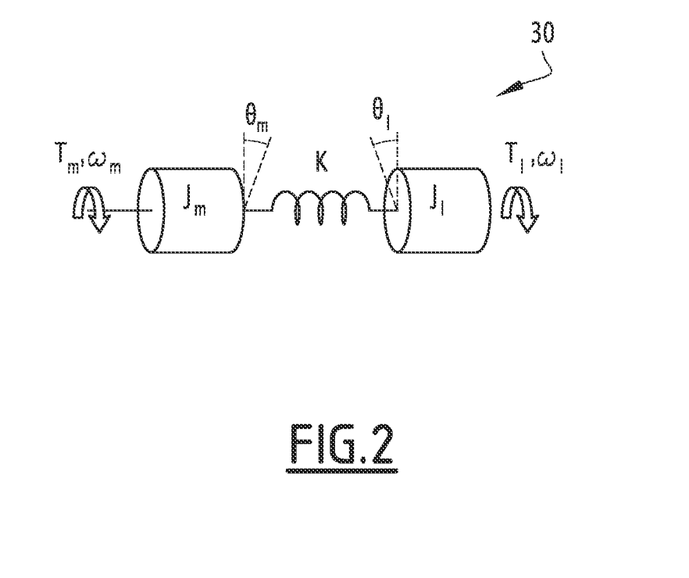
FIG. 2 is a simplified diagram of an exemplary mechanical system comprising a flexible coupling device between an electric motor and a mechanical load.

FIG. 2 illustrates an exemplary mechanical system 30, in which a motor 6 having a rotational inertia $J_m$ is coupled to a mechanical load 8 having a rotational inertia $J_l$ by means of a flexible mechanical coupling device 10 having a stiffness coefficient K.

References "$T_m$", "$\omega_m$" and "$\theta_m$" respectively correspond to the torque, the rotation speed and the angular position of the rotor of the motor 6. References "$T_l$", "$\omega_l$" and "$\theta_l$" respectively correspond to the torque, the rotation speed and the angular position of the load 8.

In practice, even though the theoretical value of the resonance frequency could be calculated from an analytical formula based on classical mechanics models, doing so is often difficult because it is not always possible to know the precise value of the stiffness coefficient K, of the rotational inertia $J_l$ and of the rotational inertia $J_m$.

Figure 3:
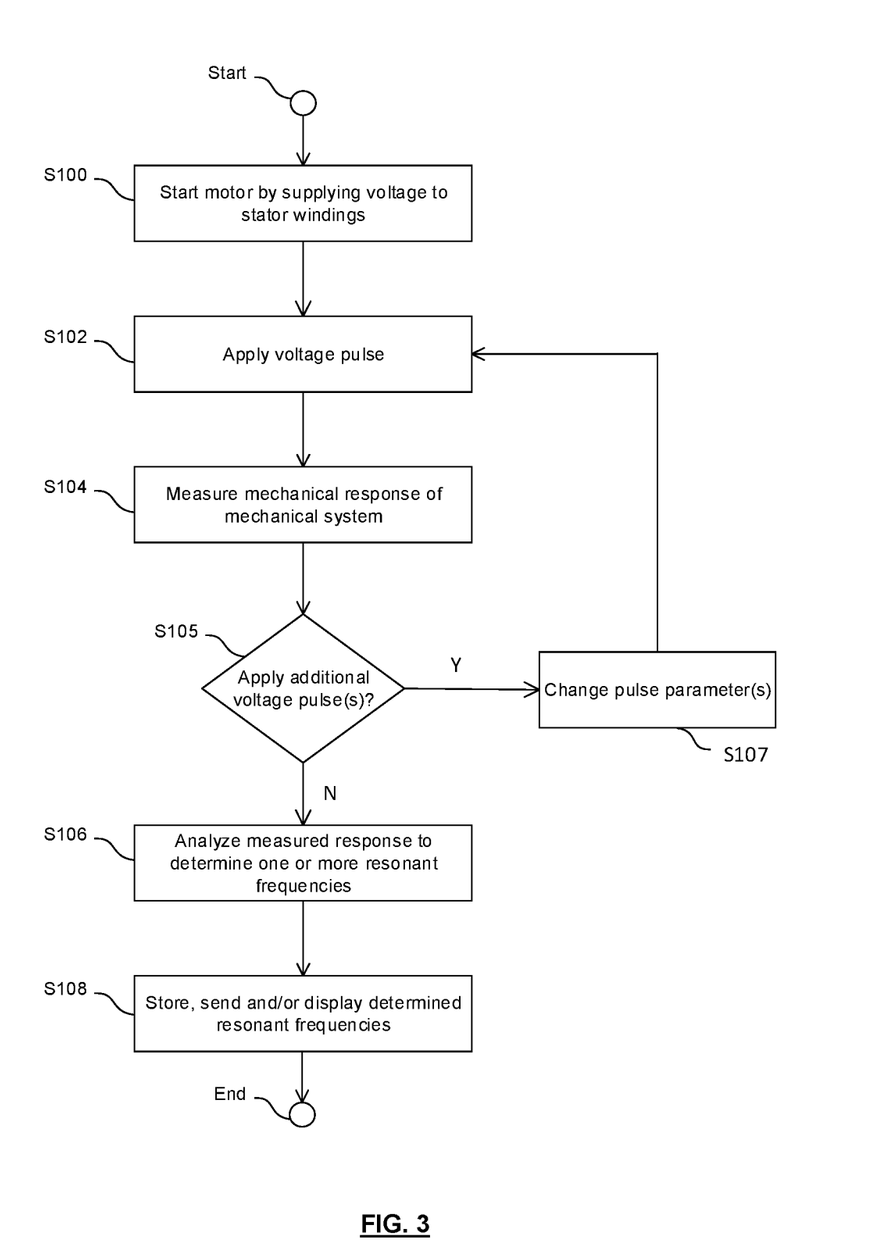
FIG. 3 is a flow chart depicting an exemplary method for determining a resonance frequency of a mechanical system according to embodiments of the invention.
Figure 4:
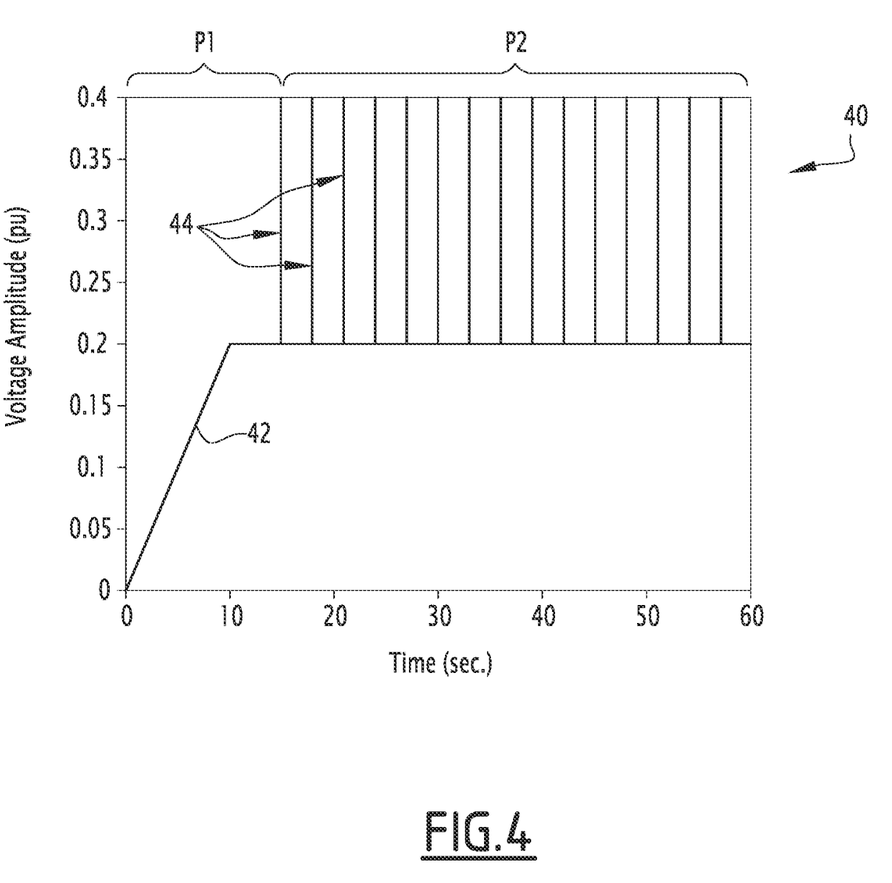
FIG. 4 is a plot depicting the amplitude of an exemplary excitation voltage signal applied to an electric motor of the mechanical system of FIG. 1 during execution of the method of FIG. 3.
Figure 5:
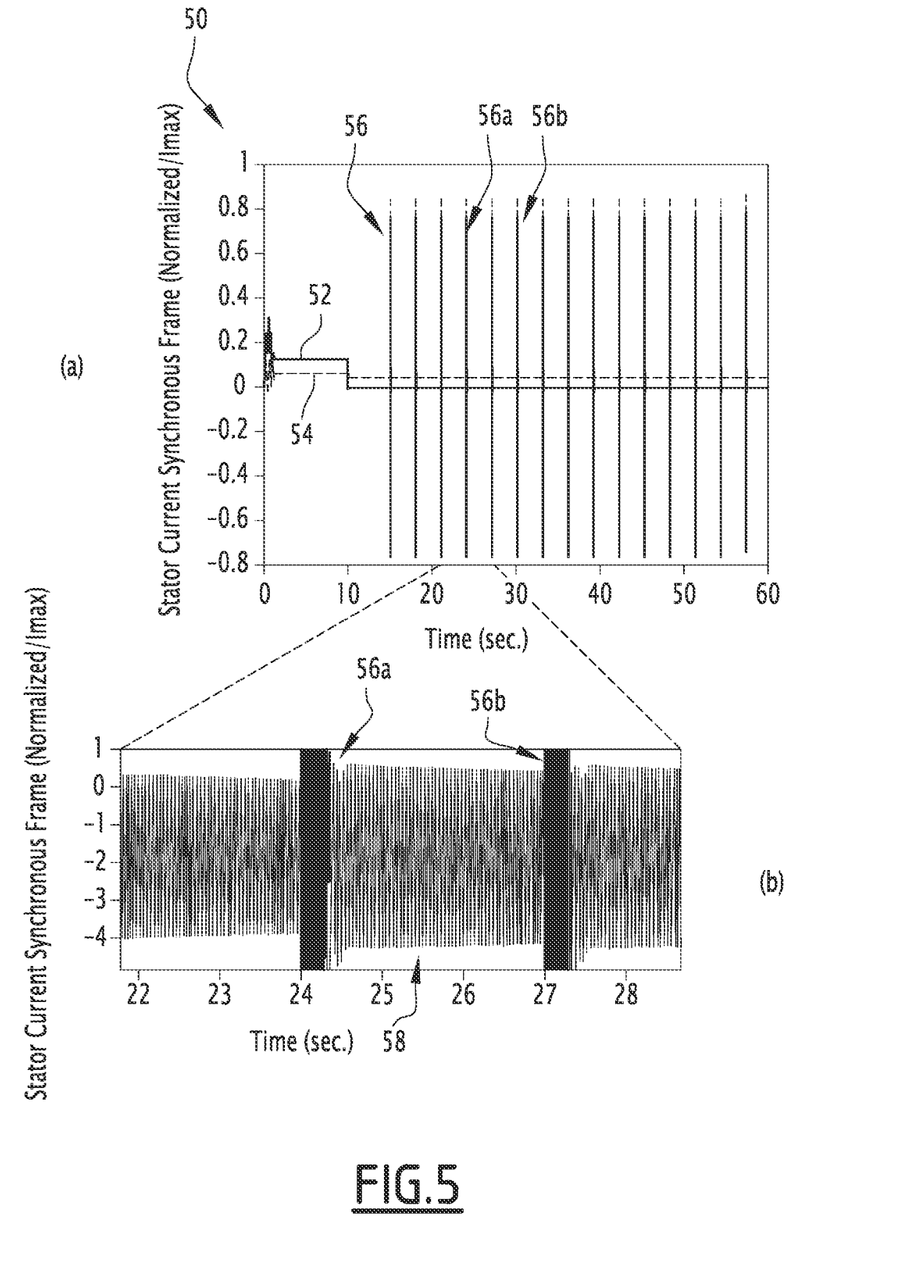
FIG. 5 is a plot depicting a response of the electric motor of the mechanical system of FIG. 1 after application of the excitation voltage signal of FIG. 4.

Embodiments of the method for determining the resonance frequency are henceforth described in reference to the flow chart of FIG. 3 and to the examples of FIGS. 4 and 5.

At step S100, the motor 6 is started by feeding a suitable supply voltage to stator windings of the motor 6, using the controller 10, for example by supplying a three-phase AC voltage between input terminals connected to the stator windings.

Preferably, the maximum amplitude of the supply voltage is gradually increased by following a specific starting sequence (e.g., a linear ramp). The controller 10 increases the supply voltage, for example by applying a V/f control strategy, until reaching a predefined voltage setpoint value corresponding to a target rotation speed.

Once the starting sequence is completed, the maximum amplitude may be kept equal to the voltage setpoint value.

For example, at this stage, the controller 10 operates in an open loop control mode.

At the end of step S100, the motor 6 is running in a so-called permanent regime, also called steady state operation, with a constant or near constant rotation speed equal to the target rotation speed.

At step S102, the device 2 applies at least one excitation signal comprising a voltage pulse superimposed to the supply voltage, using the pulse generator 14.

Preferably, the amplitude of the voltage pulse is significantly higher than the voltage setpoint value, e.g. 50% higher than said setpoint value.

Still preferably, the duration of the voltage pulse is shorter than 500 milliseconds (ms), or than 100 ms or than 50 ms.

In response to the voltage pulse, the torque exerted by the motor 6 changes briefly, causing a sudden variation of speed. The mechanical system 4 enters an excited state before quickly stabilizing back to the previous so-called permanent regime or steady state operation.

A signature of this sudden change can be observed in the stator currents, due to a magnetic coupling between the magnetic circuit on the stator side and the rotating magnetic flux created by the rotor of the motor 6.

At step S104, the measurement system 18 measures the mechanical response of the mechanical system 4, for example by measuring stator currents for each electrical phase at input terminals of the stator coils.

In alternative embodiments, the measurement system 18 may measure any other relevant operational parameter of the motor 6, such as a rotation speed, in place or along with the current measurements. The rotation speed may be measured directly with one or more rotation sensors, such as coding wheels or Hall effect sensors, or may be estimated from electrical values measured by the controller 10.

In some embodiments, several voltage pulses may be applied in succession, for example by repeating the step S102 one or more times.

The repeated voltage pulses may be identical, or may differ from the first voltage pulse by at least one pulse parameter, such as pulse length, pulse amplitude, time interval between two consecutive pulses, and so on.

For example, at step S105, the control system 16 determines whether one or more additional voltage pulses need to be applied. If needed, at step S107, at least one pulse parameter is changed by the control system 16 before generating said pulse.

Step S104 may be repeated after every voltage pulse for detecting a response to a single excitation pulse, although, in alternative embodiments, step S104 may be executed only after several pulses have been applied, in order to detect the response to several excitation pulses.

At step S106, the measured response is analyzed in order to determine one or more resonance frequencies of the system 4, for example by automatically identifying oscillations in the stator currents.

For example, in a first sub-step, stator currents expressed in the synchronous reference frame of the motor 6, such as the quadrature current $I_q$ and the direct current $I_d$, are calculated from the measured stator currents.

This calculation may be performed using the Park transform, or by any other suitable method.

In a second sub-step, the calculated stator currents $I_d$, $I_q$ are automatically analyzed to identify time-domain oscillations. The resonance frequency is then determined by identifying the frequency of said oscillations. For example, the currents oscillation frequency is equal to the resonance frequency of the mechanical system 4.

In some embodiments, the frequency analysis may include a Fast Fourier Transform, or any similar operation, in order to identify the spectrum of the current signals and then determine the resonance frequency.

In some optional yet advantageous embodiments, in order to detect the resonance frequency more easily and using less computational resources, the resonance frequency may be identified from oscillations of a phase difference between the stator currents $I_d$ and $I_q$, instead of identifying oscillations in the calculated stator currents $I_d$, $I_q$ themselves.

For example, during the second sub-step, a phase difference $\psi$ may be computed from the calculated stator currents $I_d$, $I_q$, using the following formula: $\psi = a\tan 2(I_d/I_q)$, where "a tan 2( . . . )" is the inverse tangent trigonometric function defined over the interval $[-\pi; \pi]$.

This example is not limiting and the phase difference could be calculated differently. Optionally, during a final step S108, the resonant frequency identified is stored in memory and/or sent to a remote computer server and/or displayed to an operator using a human-machine interface.

In other embodiments, the method steps described above may be executed in a different order. Some steps may be omitted. The exemplary embodiments described above do not preclude other embodiments to comprise one or more other method steps being executed along or in place of some of the steps described above.

In some embodiments, step S100 may be repeated one or more times, preferably by changing one or more operating parameters such as the slope of the voltage ramp, the voltage setpoint value, or any parameter related to the supply voltage, in order to set the motor 6 into a different rotational speed.

Once the motor 6 is running at the new target rotational speed in the so-called permanent regime, step S102 is repeated to apply another excitation voltage pulse superimposed to the supply voltage. Steps S104 and S106 are then repeated to measure the new response of the mechanical system 4 and to analyze the measured response to determine at least one resonance frequency of the mechanical system.

FIG. 4 illustrates a voltage supply signal 40 suitable for driving the motor 6 during a starting sequence. The voltage amplitude (expressed in arbitrary units) is plotted as a function of time (expressed in seconds).

During a first phase P1 corresponding to step S100, the maximum amplitude supply voltage is increased by the controller 10, for example using a linear ramp 42, going from zero to the setpoint voltage. Then, during a second phase P2 corresponding to step S102, several voltage pulses 44 are applied on top of the constant supply voltage.

FIG. 5 illustrates an example of behavior of the mechanical system 4 in response to the excitation signal of FIG. 4.

In FIG. 5, item (a) illustrates a graph 50 displaying the evolution of the amplitude of stator currents 52, 54 (expressed in normalized units) as a function of time, using the same time scale as that of FIG. 4.

Item (b) is an enlarged view of the graph 50 highlighting some features of the stator currents 52 and 54 for a specific time window.

In this example, both stator currents 52 and 54 are expressed in the synchronous frame of the motor 6. In this example, current 52 is the quadrature current $I_q$, and current 54 is the direct current $I_d$.

Both currents 52 and 54 exhibit spikes 56, which occur simultaneously for both currents 52 and 54. Each current spike highlights the response of the mechanical system 4 to an excitation voltage pulse 44. Two consecutive current spikes 56 are labeled 56a and 56b for explanatory purposes. Both spikes 56a and 56b are visible on inset (b). It can be seen that, between spikes 56, both currents 52 and 54 oscillate (oscillations 58) with a specific frequency, said oscillation frequency being equal to the resonance frequency of the mechanical system.

Figure 6:
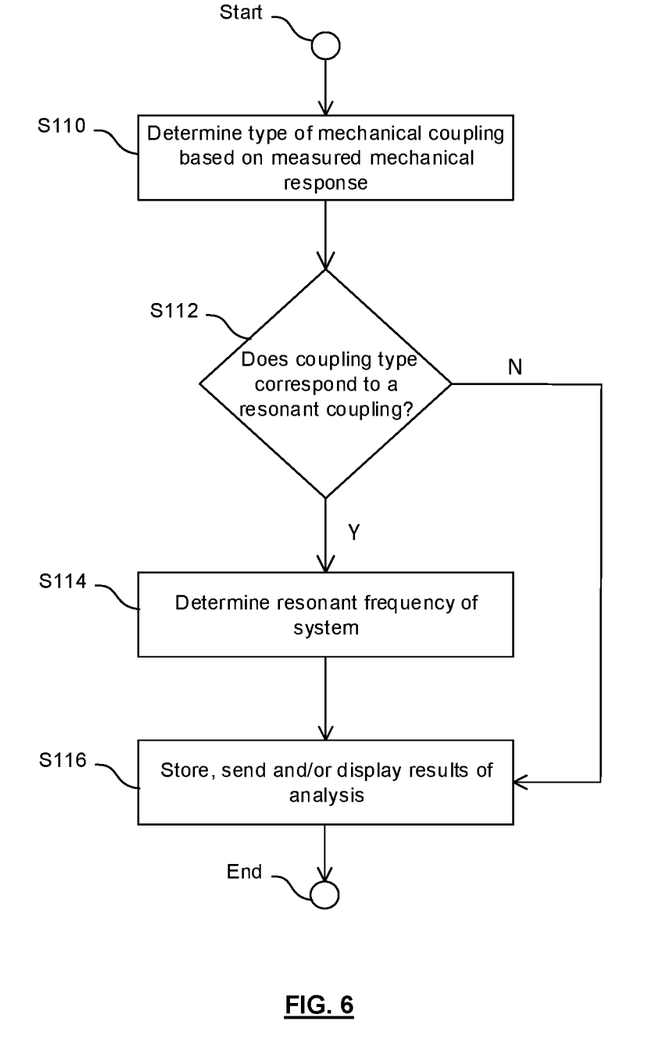
FIG. 6 is a flow chart of an exemplary method for determining mechanical properties of a mechanical system akin to that of FIG. 1.

In reference to FIG. 6 is described an additional embodiment in which the type of mechanical coupling (e.g., resonant coupling or damped coupling) between the load 8 and the motor 6 is determined during step S106 before attempting to determine the resonance frequency.

For example, during a step S110, the type of coupling is determined based on the mechanical response measured during step S104.

At step S112, if the coupling type is found to be corresponding to a resonant coupling, then during a subsequent step S114, the resonant frequency of the system 4 is automatically determined as described above.

In some embodiments, if the coupling type is found to be corresponding to a non-resonant coupling (such as a damped coupling), then the step S114 is omitted.

Figure 7:
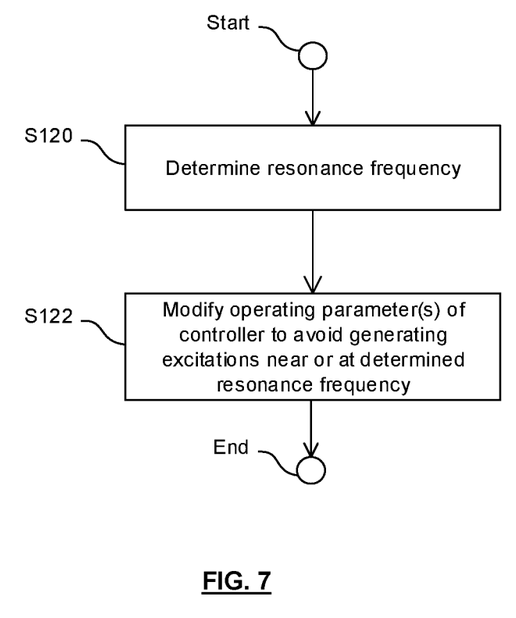
FIG. 7 is a flow chart of an exemplary method for operating a mechanical system akin to that of FIG. 1.

At step S116, the results of the analysis (including the type of coupling and the resonance frequency identified) are stored in memory and/or sent to a remote computer server and/or displayed to an operator using a human-machine interface. In reference to FIG. 7 is described a method for improving operation of the mechanical system 4.

At step S120, the resonance frequency of the mechanical system 4 is determined using a method in accordance with one of the embodiments described above.

At step S122, at least one operating parameter of the controller 10 is modified in order to avoid generating excitations near or at the resonance frequency identified during step S120. For example, one or more parameters of the controller 10 may be modified automatically by the control system 16. In alternative embodiments, a filtering device, such as a band-stop filter of a notch filter tuned to the resonance frequency may be added between the motor 6 and the controller 10.

The embodiments and alternatives described above may be combined with each other in order to build new embodiments of the invention.

The invention claimed is:

1. A method for determining a resonance frequency of a mechanical system comprising an electric motor coupled to a mechanical load, said method comprising:
   starting the motor by providing a supply voltage using a motor controller;
   once the electric motor is running at a predefined target rotational speed, applying a first excitation signal comprising a voltage pulse superimposed to the supply voltage;
   measuring a mechanical response of the mechanical system by measuring stator currents of the motor using a measurement system coupled to the motor, said measurement system comprising one or more current sensors coupled to input terminals of the stator of the motor; and
   analyzing the measured response, to determine at least one resonance frequency of the mechanical system based on the measured stator currents,
   wherein determining the resonance frequency of the mechanical system comprises:
   calculating, from the measured stator currents, corresponding stator current values expressed in a synchronous frame of the motor;
   calculating phase difference values between the calculated corresponding stator current values;
   identifying oscillations in the calculated phase difference values; and
   determining the resonance frequency based on the identified oscillations.

2. The method according to claim 1, wherein the method further comprises applying at least one additional excitation voltage pulse and measuring the corresponding response of the mechanical system, the resonance frequency being determined from the analysis of the measured responses.

3. The method according to claim 2, wherein said at least one additional excitation pulse differs from the first excitation pulse by at least one parameter, such as pulse length, or pulse amplitude, or the time interval between two consecutive pulses.

4. The method according to claim 1, wherein the method further comprises:
   changing the supply voltage using the motor controller to set the motor into a different rotational speed;
   once the electric motor is running at the new target rotational speed, applying another excitation signal comprising a voltage pulse superimposed to the supply voltage, using the pulse generator;

measuring the new mechanical response of the mechanical system, using the measurement system;
analyzing the measured response, to determine at least one resonance frequency of the mechanical system.

5. The method according to claim 1, wherein starting the motor comprises ramping up the supply voltage towards a threshold voltage value, and wherein the motor controller is placed in an open loop control mode once the electric motor is running at the predefined target rotational speed.

6. The method according to claim 1, wherein the method includes determining the type of mechanical coupling between the load and the motor based on the measured mechanical response.

7. A method for driving a mechanical system comprising an electric motor coupled to a mechanical load, said method comprising:
   determining the resonance frequency of the mechanical system using a method in accordance with claim 1;
   modifying at least one operating parameter of the motor to avoid generating excitations near or at the determined resonance frequency.

8. A device for determining a resonance frequency of a mechanical system comprising an electric motor coupled to a mechanical load, said device comprising a control system configured to:
   start the motor by providing a supply voltage using a motor controller;
   once the electric motor is running at a predefined target rotational speed, applying a first excitation signal comprising a voltage pulse superimposed to the supply voltage;
   measure a mechanical response of the mechanical system by measuring stator currents of the motor using a measurement system coupled to the motor, said measurement system comprising one or more current sensors coupled to input terminals of the stator of the motor; and
   analyze the measured response, to determine at least one resonance frequency of the mechanical system based on the measured stator currents,
   wherein determining the resonance frequency of the mechanical system comprises:
   calculating, from the measured stator currents, corresponding stator current values expressed in a synchronous frame of the motor;
   calculating phase difference values between the calculated corresponding stator current values;
   identifying oscillations in the calculated phase difference values; and
   determining the resonance frequency based on the identified oscillations.

* * * * *